United States Patent
Chiu et al.

(10) Patent No.: US 7,224,137 B2
(45) Date of Patent: May 29, 2007

(54) INSTANTANEOUS FAN STOPPING METHOD AND STRUCTURE THEREOF

(75) Inventors: Magellan Chiu, Taoyuan Hsien (TW); Chun-Lung Chiu, Taoyuan Hsien (TW); Po-Tsun Kuo, Taoyuan Hsien (TW); Wen-Shi Huang, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 0 days.

(21) Appl. No.: 11/063,553

(22) Filed: Feb. 24, 2005

(65) Prior Publication Data

US 2005/0184692 A1 Aug. 25, 2005

(30) Foreign Application Priority Data

Feb. 25, 2004 (TW) .............................. 93104821 A

(51) Int. Cl.
*H02P 3/18* (2006.01)
*H02P 3/00* (2006.01)

(52) U.S. Cl. ..................... 318/376; 318/375; 318/370; 440/87

(58) Field of Classification Search ............... 318/245, 318/254, 368–380, 588; 417/42; 62/171; 440/87
See application file for complete search history.

(56) References Cited

U.S. PATENT DOCUMENTS

| | | | | | |
|---|---|---|---|---|---|
| 4,085,594 | A | * | 4/1978 | Mayer | ........................ 62/171 |
| 4,338,525 | A | * | 7/1982 | Kilgore | ........................ 290/17 |
| 4,816,726 | A | * | 3/1989 | Novis et al. | ................. 318/293 |
| 5,214,363 | A | * | 5/1993 | Wisner et al. | ............... 318/588 |
| 5,361,024 | A | * | 11/1994 | Wisner et al. | ............... 318/588 |
| 5,376,866 | A | * | 12/1994 | Erdman | ....................... 318/254 |
| 5,845,045 | A | * | 12/1998 | Jeske et al. | ................. 388/804 |
| 5,861,724 | A | * | 1/1999 | Ackerson | .................... 318/376 |
| 6,078,156 | A | * | 6/2000 | Spurr | ........................ 318/368 |
| 6,175,204 | B1 | * | 1/2001 | Calamatas | ................... 318/375 |
| 6,211,635 | B1 | * | 4/2001 | Kambe et al. | ............. 318/254 |
| 6,232,758 | B1 | * | 5/2001 | Konda et al. | ............... 323/351 |
| 6,307,338 | B1 | * | 10/2001 | Kuner et al. | ................ 318/254 |
| 6,396,238 | B1 | * | 5/2002 | Miyahara | .................... 318/807 |
| 6,481,974 | B2 | * | 11/2002 | Horng et al. | ................. 417/42 |
| 6,864,651 | B1 | * | 3/2005 | Lee et al. | .................... 318/280 |
| 6,909,252 | B2 | * | 6/2005 | Xi | .............................. 318/254 |
| 2002/0110457 | A1 | * | 8/2002 | Horng et al. | ................. 417/42 |
| 2002/0112457 | A1 | * | 8/2002 | Whalen | ....................... 55/385.2 |
| 2004/0201938 | A1 | * | 10/2004 | Watanabe et al. | ........... 361/103 |
| 2005/0170716 | A1 | * | 8/2005 | Ylitalo | ........................ 440/87 |

* cited by examiner

*Primary Examiner*—Paul Ip
(74) *Attorney, Agent, or Firm*—Birch, Stewart, Kolasch & Birch, LLP

(57) ABSTRACT

The present invention provides an instantaneous fan stopping method and structure thereof. The method and structure can eliminate the inertial rotating state of the fan when the power supplied to the fan is cut off. In accordance with the present invention, a closed circuit is formed between the two terminals of the coil used to drive the fan. When the closed circuit is formed, the inertial rotation of the fan can generate an induced current in this coil, which, in turn, generates a magnetic force to stop the fan.

22 Claims, 4 Drawing Sheets

INSTANTANEOUS FAN STOPPING METHOD AND STRUCTURE THEREOF

RELATED APPLICATIONS

The present application is based on, and claims priority from, Taiwan Application Serial Number 93104821, filed Feb. 25, 2004, the disclosure of which is hereby incorporated by reference herein in its entirety.

FIELD OF THE INVENTION

The present invention relates to a stopping method, and more particularly, to an instantaneous fan stopping method and structure thereof, which are able to immediately stop a fan after the power supplied to the fan is cut off.

BACKGROUND OF THE INVENTION

A fan is the main heat sink in an electrical product. When the temperature of the electrical product is higher than a certain temperature, the fan is triggered to dissipate the heat in order to reduce the temperature. Once the temperature of the electrical product is under the certain temperature, the fan is stopped.

Typically, a fan is assembled into a system to prevent the system from crashing as a result of high temperatures. A device with a higher calculating speed requires a fan with a higher rotational speed. With a higher rotational speed comes greater difficulty in stopping a fan quickly. That is, even after cutting off power to the fan, the fan continues to rotate by inertia for some time before finally being overcome by friction.

Unfortunately, such inertial rotation generates a lot of problems. Oftentimes, a user ignores the inertial rotating state of the fan and injures himself by carelessly touching the fan. Furthermore, in routine diagnostic work, waiting for the fan to stop rotating is the bottleneck of improving work efficiency.

SUMMARY OF THE INVENTION

Accordingly, the main purpose of the present invention is to provide a method for immediately stopping a fan. In accordance with the method, the fan can be instantaneously stopped when the power supplied to the fan is cut off. In other words, waiting for the fan to stop is not necessary, and therefore, work efficiency can be improved.

Another objective of the present invention is to provide a method for immediately stopping the fan, wherein the method can eliminate the inertial rotating state of the fan when the power supplied to the fan is cut off in order to avoid injuring users.

In accordance with this method, the fan is forced to stop rotating when the power supplied to the fan is cut off. In this method, two coils driving the fan rotation are connected together to form a closed circuit so as to generate a counter-electromotive force and thereby instantaneously stop the fan. This counter-electromotive force is the induced electromotive force generated when the fan is in the inertial rotating state.

In accordance with the first embodiment of a full bridge circuit structure, when the power supplied to a fan is cut off, the residual energy stored in a capacitor triggers a driving integrated circuit to output a control signal. A pair of semiconductor switching devices located on the up or down bridge of the full bridge circuit structure is turned on by this control signal. The coils and the turned-on semiconductor switching devices form a closed circuit to generate a counter-electromotive force and thereby immediately stop the fan. The semiconductor switching devices can also be turned on by triggering a control program recorded in a micro-controller.

In accordance with the second embodiment of a half bridge circuit structure, when the power supplied to a fan is cut off, the residual energy stored in a capacitor turns on a semiconductor switching device so as to form a closed circuit in the coils. The closed circuit generates a counter-electromotive force to immediately stop the fan. The semiconductor switching device can also be turned on by triggering a control program recorded in a micro-controller.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENT

Without limiting the spirit and scope of the present invention, the method proposed in the present invention is illustrated with two preferred embodiments. One of ordinary skill in the art, upon acknowledging the embodiment, can apply the method for immediately stopping a fan of the present invention to various fans. The method can eliminate the inertial rotating state of the fan when the power supplied to the fan is cut off, thereby avoiding injury of users. Moreover, waiting for the fan to stop rotating is not necessary and can be eliminated by this method. Therefore, work efficiency can be improved. The present invention is explained by the following embodiments. However, these embodiments do not limit the scope of the present invention.

Typically, a DC fan is driven by an alternating magnetic field generated by a driving circuit. The rotational speed of this DC fan is related to the working voltage. The operation principle of a DC fan is described as follows. When a current flows through a conductor, a magnetic field is generated around the conductor. If this conductor is located within a fixed magnetic field, an attractive or repulsive force is generated, which can cause physical motion. When the attractive or repulsive force is larger than a frictional force on the bearings of a DC fan, the vanes of the DC fan are caused to rotate. A switching circuit is electrically connected with the driving circuit and can be switched to generate the alternating magnetic field. The switching circuit is a full bridge or a half bridge circuit structure.

The DC fan of the present invention includes a stator coil, a switching circuit and a drive circuit. The switching circuit couples with the stator coil. The drive circuit couples with the switching circuit.

Figure 1A:
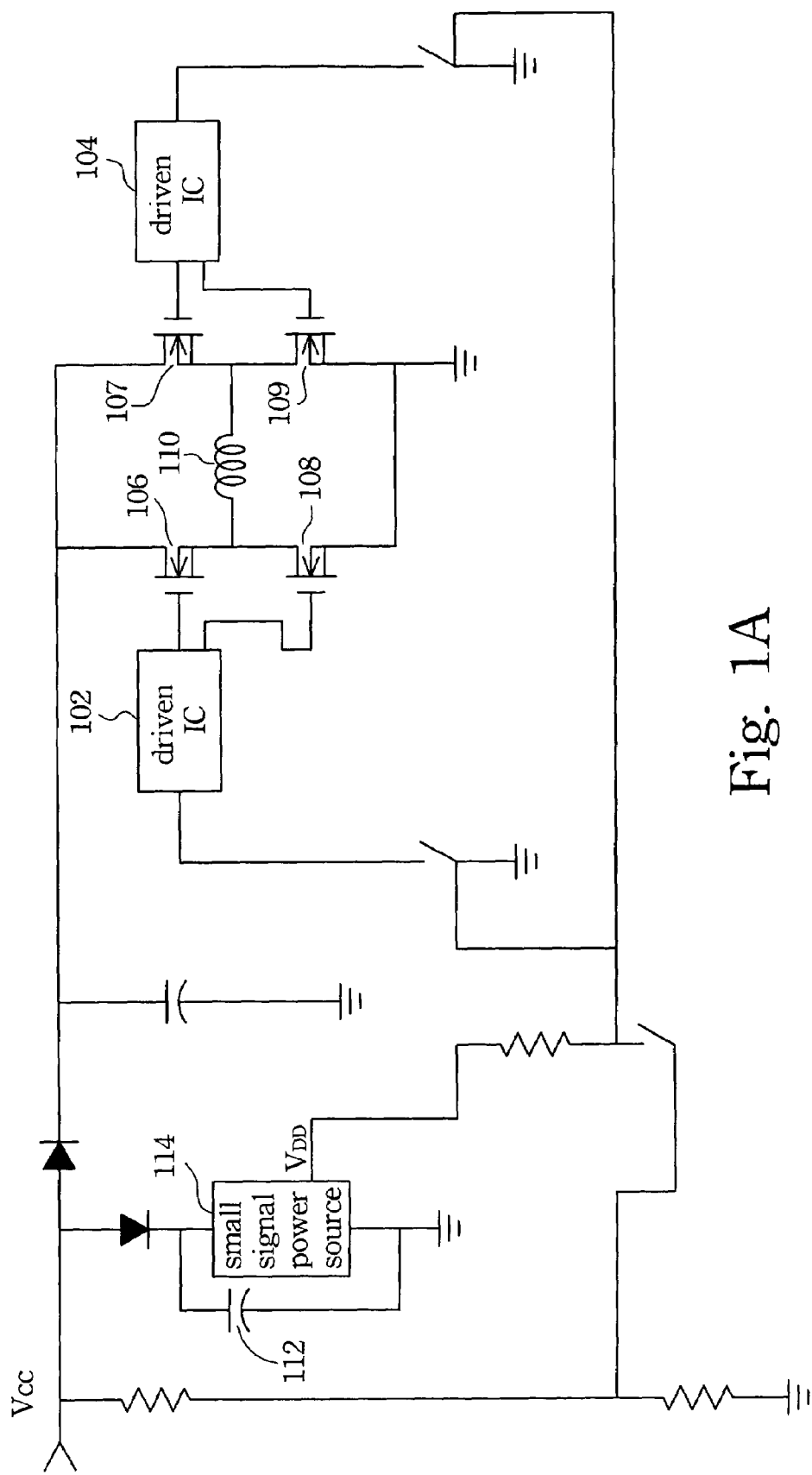
FIG. 1A illustrates a schematic diagram of a DC fan in a full bridge circuit structure in accordance with the first embodiment of the present invention.

FIG. 1A illustrates a schematic diagram in accordance with the first embodiment of the present invention. In this embodiment, the switching circuit is a full bridge circuit structure. The DC fan comprises a rotor and a stator coil (not shown in this figure). The rotor is the rotational part of the fan, and the stator electrically connected with a driving circuit is the fixed part of the fan that provides an ambient magnetic field. When power is supplied to the rotor and the stator coils, a magnetic field is generated that interacts with the ambient magnetic field, causing the vanes of the DC fan to move. The method of the present invention is to form a closed circuit between the two terminals of the stator coil when the power supplied to the fan is cut off and the DC fan is in an inertial rotating state. This inertial rotation induces an electromotive force in the closed circuit, which generates a magnetic field. The magnetic force of the magnetic field with a fixed pole is related to the rotational speed of the fan and is used to stop the rotator of the fan.

In accordance with the full bridge circuit structure, the drive circuit includes two driving integrated circuits (IC) 102 and 104. The two driving integrated circuits (IC) 102 and 104 are used to respectively generate two driving signals to switch the four semiconductor switches 106, 107, 108 and 109. The two driving integrated circuits 102 and 104 are the stoppage-controlling integrated circuits. The phase difference between the two driving signals is 180 degrees. The semiconductor switch is a MOS transistor. A small signal power source 114 is used to control the two driving integrated circuits 102 and 104 so as to output driving signals.

When the driving integrated circuit 102 outputs a driving signal to turn on the semiconductor switch 106, another driving signal with a 180-degree phase difference, also generated by the driving integrated circuit 102, turns off the semiconductor switch 108. Concurrently, the driving integrated circuit 104 also outputs two driving signals to turn on the semiconductor switch 109 and turn off the semiconductor switch 107. In other words, the semiconductor switches 106 and 109 are in one same switching state while the semiconductor switches 107 and 108 are in another same switching state. Therefore, the direction of current flow in the coil 110 can be changed when the driving integrated circuits 102 and 104 respectively switch the four semiconductor switches 106, 107, 108 and 109. The different current directions generate different magnetic poles to drive the fan motion.

However, when the power supplied to the fan is cut off, the vanes of the fan continue to rotate by inertia for a time. In other words, the fan does not stop instantaneously. Therefore, the method of the present invention is to form a closed circuit between the two terminals of the coil 110 when the power supplied to the fan is cut off. Consequently, the magnetic flux in the closed circuit is changed due to the inertial rotation so that an electromotive force and a current are induced in the closed circuit. The induced current flows through the coil 110 to generate a counter magnetic field, which immediately stops the inertial rotation of the fan. The stopping force is proportional to the rotational speed of the fan.

In other words, when the power supplied to the fan is cut off, the driving integrated circuits 102 and 104 turn on the semiconductor switches 106 and 107 and turn off the semiconductor switches 108 and 109 so as to form a closed circuit between the two terminals of the coil 110. It is noticed that the driving integrated circuits 102 and 104 can also turn on the semiconductor switches 108 and 109 and turn off the semiconductor switches 106 and 107 to form a closed circuit between the two terminals of the coil 110.

In accordance with the full bridge circuit structure in FIG. 1A, at the moment the power supplied to the fan is cut off, the small signal power source 114 powered by the residual energy stored in the capacitor 112 outputs a control signal to trigger the driving integrated circuits 102 and 104. The capacitor 112 and the small signal power source 114 are formed a control device to control the full bridge circuit. The driving integrated circuits 102 and 104 can turn on the semiconductor switches 106 and 107 and turn off the semiconductor switches 108 and 109 or turn on the semiconductor switches 108 and 109 and turn off the semiconductor switches 106 and 107 to form a closed circuit between the two terminals of the coil 110.

Figure 1B:
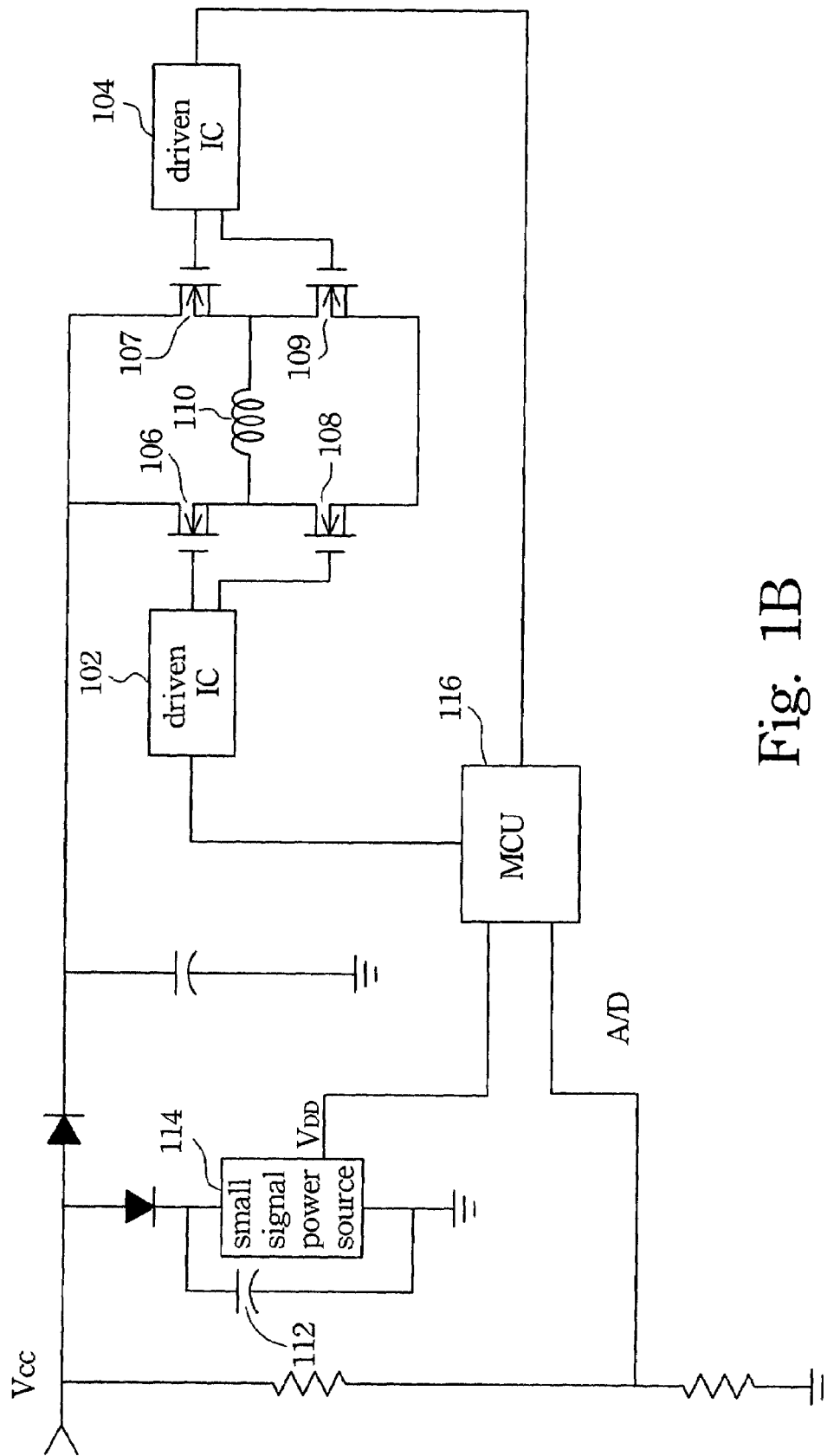
FIG. 1B illustrates a schematic diagram of a DC fan in a full bridge circuit structure with a programmed micro-controller in accordance with the first embodiment of the present invention.

FIG. 1B illustrates a schematic diagram of a DC fan in a full bridge circuit structure using a programmed micro-controller 116 to trigger the driving integrated circuits 102 and 104 so as to form a closed circuit between the two terminals of the coil 110. A control procedure is recorded in the micro-controller 116 prior to operation. Once the power supplied to the fan is cut off, the control procedure in the micro-controller is triggered to control the driving integrated circuits 102 and 104. Then, the driving integrated circuits 102 and 104 can turn on the semiconductor switches 106 and 107 and turn off the semiconductor switches 108 and 109 or turn on the semiconductor switches 108 and 109 and turn off the semiconductor switches 106 and 107 to form a closed circuit between the two terminals of the coil 110. That is, when the power supplied to the fan is cut off, the inertial rotation generates an induced current in the coil 110, which, in turn, generates a counter magnetic field that immediately stops the inertial rotation of the fan.

Figure 2A:
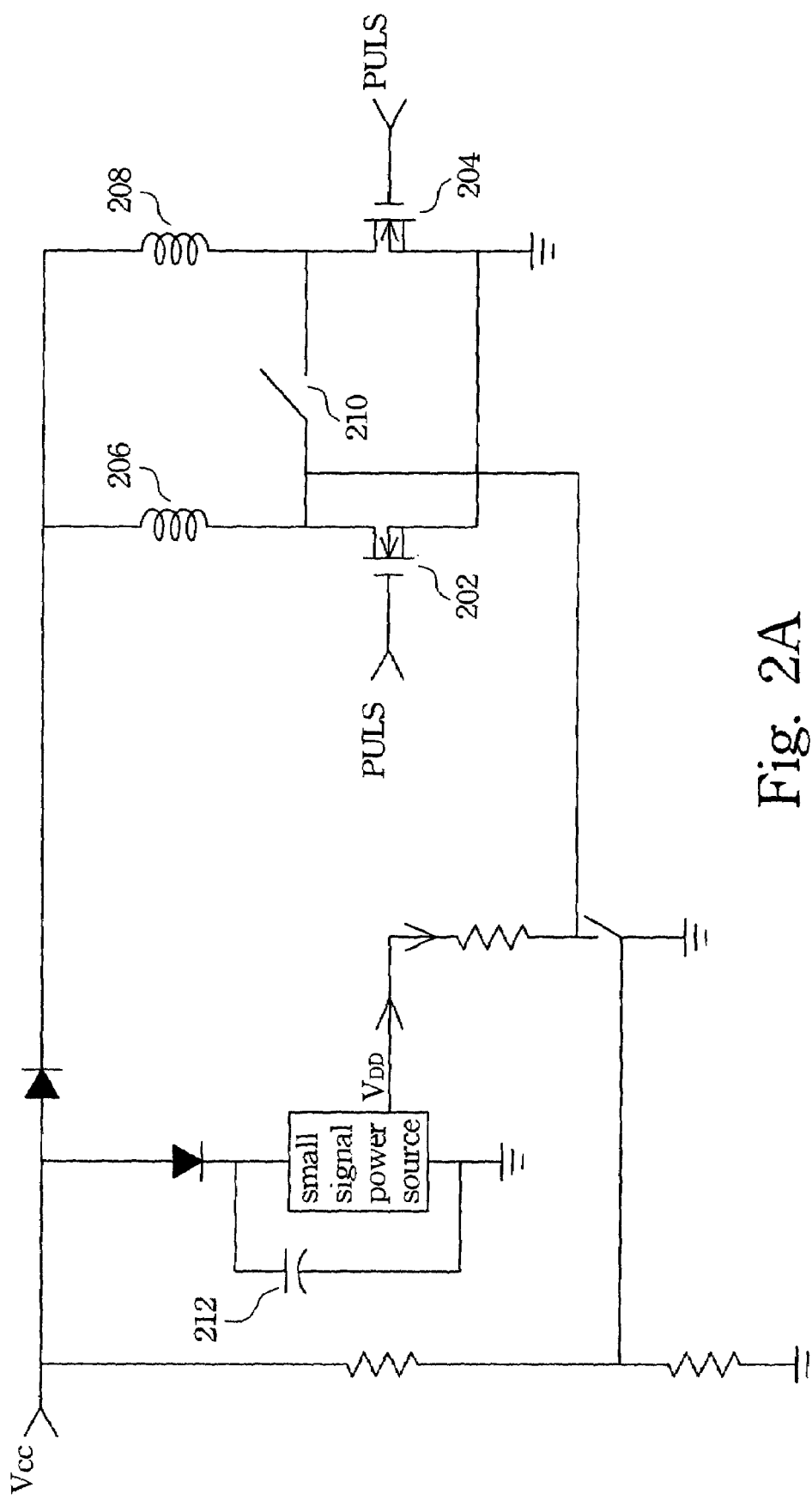
FIG. 2A illustrates a schematic diagram of a DC fan in a half bridge circuit structure in accordance with the second embodiment of the present invention.

FIG. 2A illustrates a schematic diagram in accordance with the second embodiment of the present invention. In this embodiment, the switching circuit is a half bridge circuit structure. Two pulse signals are used to switch two semiconductor switches 202 and 204 in order to respectively control the current flowing through the two coils 206 and 208 and thereby generate a magnetic field. The phase difference between the two pulse signals is 180 degrees. The semiconductor switch is a MOS transistor.

As described in the first embodiment, when the power supplied to the fan is cut off, a closed circuit is formed between the two coils 206 and 208. At this time, the inertial rotation of the fan induces currents in the coils 206 and 208, which, in turn, generate counter magnetic fields that instantaneously stop the inertial rotation of the fan.

A switching device 210 is assembled between the two coils 206 and 208. When the power supplied to the fan is cut off, the residual energy stored in the capacitor 212 triggers the small signal power source to output a control signal in order to activate the switching device 210, even to turn off the semiconductor switches 202 and 204, hence forming a closed circuit between the two coils 206 and 208. The capacitor 212 and the small signal power source are formed a control device to control the half bridge circuit. This switching device 210 is a relay that can automatically turn on to form a closed circuit between the two coils 206 and 208 when the power supplied to the fan is cut off.

Figure 2B:
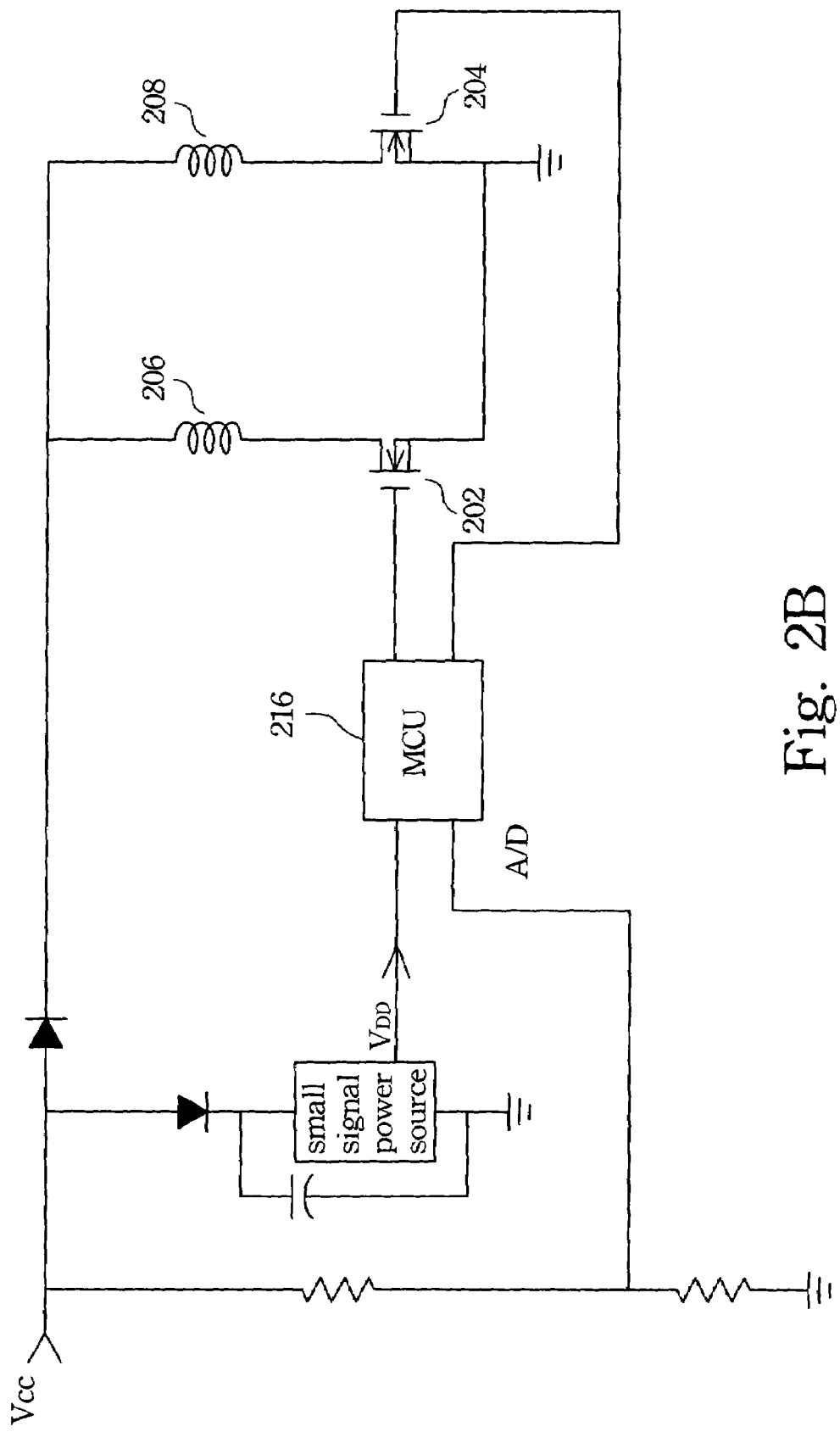
FIG. 2B illustrates a schematic diagram of a DC fan in a half bridge circuit structure with a programmed micro-controller in accordance with the second embodiment of the present invention.

FIG. 2B illustrates a schematic diagram of a DC fan in a half bridge circuit structure using a programmed micro-controller 216 to switch the semiconductor switches 202 and 204. A control procedure is recorded in the micro-controller 216 prior to operation. Once the power supplied to the fan is cut off, the control procedure in the micro-controller is triggered to turn on the semiconductor switches 202 and 204 in order to form a closed circuit between the two coils 206 and 208. That is, when the power supplied to the fan is cut off, the inertial rotation generates an induced current in the coils 206 and 208, which consequently generates a counter magnetic field to instantaneously stop the inertial rotation of the fan.

In addition, the switching circuits are also electrically connected with a control device, a micro-controller, a transistor, an integrated circuit or a stoppage-controlling circuit, and switched by the control device, the micro-controller, the transistor, the integrated circuit or the stoppage-controlling circuit. Accordingly, this method of the present invention is to form a closed circuit between the two terminals of the stator coil when the power supplied to the fan is cut off and the DC fan is in an inertial rotating state. This inertial rotation induces an electromotive force in the closed circuit, which remains in the closed circuit while the fan continues to rotate by inertia. The electromotive force generates a magnetic field. The magnetic force of the magnetic field with a fixed pole is related to the rotational speed of the fan. The direction of the magnetic force is opposite to the direction of the fan rotation. Therefore, the magnetic force is used to instantaneously stop the rotator of the fan. In accordance with the present invention, the method can immediately stop the fan when the power supplied to the fan is cut off so that the method can avoid injuring careless users. Furthermore, work efficiency can be improved by eliminating the bottleneck of waiting for the fan to stop rotating. It is noticed that no additional device is required to assemble into the original circuit in the present invention.

As is understood by a person skilled in the art, the foregoing preferred embodiments of the present invention are illustrative of the present invention rather than limiting of the present invention. It is intended that this description cover various modifications and similar arrangements included within the spirit and scope of the appended claims, the scope of which should be accorded the broadest interpretation so as to encompass all such modifications and similar structure.

What is claimed is:

1. A method for stopping a fan, wherein said fan comprises a stator, a switching circuit and a driving circuit, said switching circuit is connected between said stator and said driving circuit, said method comprising:
   generating a control signal when a power supplied to said fan is cut off, wherein a control device powered by a residual energy stored in a capacitor is used to generate said control signal;
   receiving said control signal by said driving circuit to control said switching circuit to form a closed circuit in said stator, wherein an induced magnetic force due to an inertial rotation of said fan is generated in said closed circuit, and said induced magnetic force with a direction opposite to the rotating direction of said fan is used to provide a stop force to said fan.

2. The method of claim 1, wherein said stator comprises at least one coil.

3. The method of claim 1, wherein said switching circuit is a full bridge or a half bridge circuit structure.

4. The method of claim 1, wherein said driving circuit is a micro-controller, an integrated circuit or a stoppage-controlling circuit.

5. The method of claim 1, wherein said switching circuit includes a plurality of transistors or a plurality of semiconductor switches.

6. The method of claim 1, wherein said stop force is related to said rotating of said fan.

7. An instantaneously stoppable fan structure that is able to be instantaneously stopped when a power supplied to said fan is cut off, comprising:
   a stator;
   a switching circuit electrically connected with said stator;
   a driving circuit electrically connected with said switching circuit; and
   a control device generating a control signal to said driving circuit to control said switching circuit to form a closed circuit in said stator when a power supplied to said fan is cut off, wherein said controller unit is powered by a residual energy stored in a capacitor.

8. The structure of claim 7, wherein said stator comprises at least one coil.

9. The structure of claim 7, wherein said switching circuit is a full bridge or a half bridge circuit structure.

10. The structure of claim 7, wherein said driving circuit is a micro-controller, an integrated circuit or a stoppage-controlling circuit.

11. The structure of claim 7, wherein said switching circuit includes a plurality of transistors or a plurality of semiconductor switches.

12. The structure of claim 7, further comprising a programmed micro-controller to trigger said driving circuit.

13. An instantaneously stoppable fan structure that is able to be instantaneously stopped when a power supplied to said fan is cut off, comprising:
   a stator;
   a switching circuit electrically connected with said stator; and
   a control device generating a control signal to activate said switching circuit so as to form a closed circuit in said stator when a power supplied to said fan is cut off, wherein said controller device is powered by a residual energy.

14. The structure of claim 13, wherein said stator comprises at least one coil.

15. The structure of claim 13, wherein said switching circuit is a full bridge or a half bridge circuit structure.

16. The structure of claim 13, wherein said switching circuit includes a plurality of transistors or a plurality of semiconductor switches.

17. The structure of claim 13, further comprising a programmed micro-controller, a transistor, an integrated circuit or a stoppage-controlling circuit for trigger said switching circuit.

18. The structure of claim 13, wherein said control device comprises a small signal power source and a capacitor for storing the residual energy.

19. The structure of claim 13, further comprising two driving integrated circuits respectively generate two driving signals to switch said switching circuit.

20. The structure of claim 19, wherein the phase difference between said two driving signals is 180 degrees.

21. The structure of claim 13, further comprising two pulse signals switch said switching circuit.

22. The structure of claim 21, wherein the phase difference between said two driving signals is 180 degrees.

* * * * *